US012033609B2

(12) United States Patent
McCutcheon

(10) Patent No.: US 12,033,609 B2
(45) Date of Patent: Jul. 9, 2024

(54) AUDIO SYSTEM AND SIGNAL PROCESSING METHOD FOR AN EAR MOUNTABLE PLAYBACK DEVICE

(71) Applicant: ams AG, Premstätten (AT)

(72) Inventor: Peter McCutcheon, Eindhoven (NL)

(73) Assignee: AMS AG, Premstätten (AT)

( * ) Notice: Subject to any disclaimer, the term of this patent is extended or adjusted under 35 U.S.C. 154(b) by 163 days.

(21) Appl. No.: 17/765,227

(22) PCT Filed: Sep. 17, 2020

(86) PCT No.: PCT/EP2020/075980

§ 371 (c)(1),
(2) Date: Mar. 30, 2022

(87) PCT Pub. No.: WO2021/063688

PCT Pub. Date: Apr. 8, 2021

(65) Prior Publication Data

US 2022/0343886 A1 Oct. 27, 2022

(30) Foreign Application Priority Data

Sep. 30, 2019 (EP) .................................... 19200528

(51) Int. Cl.
*G10K 11/178* (2006.01)
*H04R 1/10* (2006.01)

(52) U.S. Cl.
CPC .. *G10K 11/17817* (2018.01); *G10K 11/17854* (2018.01); *G10K 11/17881* (2018.01); *G10K 11/17885* (2018.01); *H04R 1/1083* (2013.01); *G10K 2210/1081* (2013.01); *H04R 2460/01* (2013.01)

(58) Field of Classification Search
None
See application file for complete search history.

(56) References Cited

U.S. PATENT DOCUMENTS

| | | | |
|---|---|---|---|
| 4,494,074 | A | 1/1985 | Bose |
| 5,138,664 | A | 8/1992 | Kimura et al. |
| 8,693,700 | B2 | 4/2014 | Bakalos et al. |
| 9,076,431 | B2 | 7/2015 | Kamath et al. |
| 9,293,128 | B2 | 3/2016 | Goldstein |

(Continued)

FOREIGN PATENT DOCUMENTS

| | | | |
|---|---|---|---|
| EP | 3451327 | A1 | 3/2019 |
| EP | 3503572 | A1 | 6/2019 |

OTHER PUBLICATIONS

Elliot, S.: "Signal Processing for Active Control", Academic Press, 2001, 23 pages.

(Continued)

*Primary Examiner* — Kenny H Truong
(74) *Attorney, Agent, or Firm* — MH2 TECHNOLOGY LAW GROUP LLP

(57) ABSTRACT

An audio system for an ear mountable playback device comprises a speaker and an error microphone that is configured to sense sound being output from the speaker and ambient sound. The audio system further comprises a detection engine that is configured to determine a driver response between the speaker and the error microphone, and to estimate a leakage condition from the determined driver response.

18 Claims, 5 Drawing Sheets

(56) References Cited

U.S. PATENT DOCUMENTS

| | | | | |
|---|---|---|---|---|
| 10,347,236 | B1 | 7/2019 | Bastyr et al. | |
| 2010/0303256 | A1 | 12/2010 | Clemow | |
| 2013/0216060 | A1 | 8/2013 | Narayan et al. | |
| 2014/0072135 | A1 | 3/2014 | Bajic et al. | |
| 2015/0243271 | A1* | 8/2015 | Goldstein ........ | G10K 11/17854 381/71.6 |
| 2016/0300562 | A1 | 10/2016 | Goldstein | |
| 2017/0110105 | A1 | 4/2017 | Kumar et al. | |
| 2018/0359560 | A1* | 12/2018 | Defraene ......... | G10K 11/17854 |

OTHER PUBLICATIONS

International Search Report and Written Opinion in corresponding International Application No. PCT/EP2020/075980, mailed on Nov. 24, 2020, 16 pages.
European Office Action in European Application No. 19200528.8 mailed on Dec. 6, 2022, 6 pages.

* cited by examiner

AUDIO SYSTEM AND SIGNAL PROCESSING METHOD FOR AN EAR MOUNTABLE PLAYBACK DEVICE

CROSS-REFERENCE TO RELATED APPLICATIONS

The present application is the national stage entry of International Patent Application No. PCT/EP2020/075980, filed on Sep. 17, 2020, and published as WO 2021/063688 A1 on Apr. 8, 2021, which claims the benefit of priority of European Patent Application No. 19200528.8, filed on Sep. 30, 2019, all of which are incorporated by reference herein in their entireties.

FIELD OF THE INVENTION

The present disclosure relates to an audio system and to a signal processing method, each for an ear mountable playback device, e.g. a headphone, comprising a speaker.

BACKGROUND OF THE INVENTION

Nowadays a significant number of headphones, including earphones, employ techniques that enhance the sound experience of a user, such as noise cancellation techniques. For example, such noise cancellation techniques are referred to as active noise control or ambient noise cancellation, both abbreviated with ANC. ANC generally makes use of recording ambient noise that is processed for generating an anti-noise signal, which is then combined with a useful audio signal to be played over a speaker of the headphone. ANC can also be employed in other audio devices like handsets or mobile phones.

Various ANC approaches make use of feedback, FB, microphones, feedforward, FF, microphones or a combination of feedback and feedforward microphones. Efficient FF and FB ANC is achieved by tuning a filter or by adjusting an audio signal, e.g. via an equalizer, based on given acoustics of a system.

Hybrid noise cancellation headphones are generally known. For instance, a microphone is placed inside a volume that is directly acoustically coupled to the ear drum, conventionally close to the front of the headphones driver. This is referred to as the feedback (FB) microphone. A second microphone, the feedforward (FF) microphone, may be placed on the outside of the headphone, such that it is acoustically decoupled from the headphones driver.

For each system to work effectively, the headphone preferably makes a near perfect seal to the ear/head of the user which does not change whilst the device is worn and that is consistent for any user. Any change in this seal as a result of a poor fit will change the acoustics and ultimately the ANC performance. This seal is typically between the ear cushion and the user's head, or between an earphone's rubber tip and the ear canal wall.

For most noise cancellation headphones and earphones, effort is put into maintaining a consistent fit when being worn and from user to user to ensure that the headphone acoustics do not change and always have a good match to the noise filters. However, "leaky" earphones and headphones, which do not make a seal between the ear cushion/tips and the ear, have a large variation in the acoustics when worn by different people. Furthermore the acoustics can vary for the user whilst the earphone moves in their ear as a result of typical everyday head movements. Therefore, for any headphones or earphones which are leaky, some adaptation is required to ensure that the filters always match the acoustics.

Some headphones and earphones already feature some form of off-ear detection, i.e. a detection whether the headphone is worn by a user or not. Typically this is achieved by several means including optical proximity sensors, pressure sensors and capacitive sensors. However, the off-ear detection merely is able to distinguish between two extreme states of acoustic leakage, i.e. whether the headphone is on the ear or off the ear. Moreover, the listed solutions all require adding an extra sensor into the device solely for this purpose.

An objective to be achieved is to provide an improved concept for detecting an acoustical leakage of an ear mountable playback device like a headphone, earphone or mobile handset.

This object is achieved with the subject matter of the independent claims. Embodiments and developments of the improved concept are defined in the dependent claims.

The improved concept is based on the idea of estimating a leakage condition in terms of its extent, i.e. determining a degree of acoustic leakage between an ear mountable playback device and the ear canal of the user, during regular usage of said ear mountable playback device. This leakage condition can consequently be used to enhance the sound experience of the user, e.g. by removing unwanted portions of a sound signal transmitted to the ear canal of the user. This enhancement can be achieved by adjusting a noise control algorithm based on the estimated leakage condition, for instance. For example, FF and/or FB filters of a noise canceling headset may be tuned depending on the extent of the acoustic leakage.

In contrast, at present tuning of the aforementioned filters for conventional earphones and headsets is only performed once during or at the end of production of the ANC devices, for example by measuring acoustic properties of the device. In particular, tuning is performed during a calibration process with some measurement fixture like an artificial head with a microphone in the ear canal of the artificial head. The measurement, including the playing of some test sound, is coordinated from some kind of processing device which can be a personal computer or the like. To achieve an optimum ANC performance for each ANC device produced, a dedicated measurement has to be performed for each of the ANC devices under control of the processing device, which is time-consuming, especially if larger volumes of ANC devices are to be calibrated.

SUMMARY OF THE INVENTION

In the following, the improved concept will be explained, sometimes referring to a headphone or earphone as an example of the playback device. However, it shall be appreciated that this example is not limiting and will also be understood by a skilled person for other kinds of playback devices where different leakage conditions can occur during usage by a user. In general the term playback device should include all types of audio reproducing devices.

In an embodiment of an audio system according to the improved concept, which is to be used for an ear mountable playback device like a headphone, earphone, mobile phone, handset or the like, this system comprises a speaker and an error microphone that is configured to sense sound being output from the speaker and ambient sound. The audio system further comprises a detection engine that is configured to determine a driver response between the speaker and the error microphone, and to estimate a leakage condition from the determined driver response.

For example, the speaker of the audio system is arranged in a housing of the playback device such that a first volume is arranged on the preferential side for sound emission of the speaker. The housing may have an opening for coupling the first volume to the ear canal volume of the user. The housing may further comprise a front vent that is covered with an acoustic resistor and couples the first volume to the ambient environment. The front volume will also be coupled to the ambient environment via an acoustic leakage due to an imperfect fit of the earphone to the ear of the user. This acoustic leakage varies from person to person and depends on how the earphone sits in the ear at a specific time. The error microphone is arranged within the first volume such that it detects sound output from the speaker as well as ambient sound. For example, it is arranged close to the opening.

In addition, a second volume is arranged within the housing on the side of the speaker facing away from the preferential side for sound emission. The second volume is acoustically coupled to the ambient environment via a rear vent of the housing which may also be covered with an acoustic resistor. A further microphone may for example be arranged outside of the rear volume, i.e. at the outside of the housing, in order to predominantly sense ambient sound.

The detection engine is configured to determine a driver response between the speaker and the error microphone. The driver response corresponds to the driver, i.e. speaker, to error microphone transfer function. For example, the speaker output is a wanted signal, such as a music signal, that is consequently detected by means of the error microphone in addition to ambient noise due to an acoustic leakage.

The detection engine is further configured to estimate said leakage condition from the determined driver response. The estimation of an acoustic leakage based on the determined driver response offers a solution for adapting noise cancelling filters of a feedforward, feedback or hybrid ANC system for situations when the wanted signal, e.g. music, is loud relative to ambient noise. In these situations, determining a coherence between ambient noise signals at a further microphone of the audio system, e.g. a feedforward microphone, and at the error, i.e. feedback microphone, may be not possible causing an adaptive noise cancellation process to substantially deviate or oscillate around an optimum solution and resulting in a sub-optimal noise cancellation process.

Other systems that feature a leakage detection realize this feature by adapting and monitoring a filter that matches the driver response. In contrast, the improved concept of estimating the leakage directly from the driver response eliminates the error from the matching of the filter to the driver response, which is particularly an issue when adaption of the filter has not yet converged.

In some embodiments, determining the driver response comprises measuring a property of a first signal that is applied to the speaker, measuring a property of a second signal that is detected by the error microphone, and calculating the driver response from the first and the second property.

For example, the leakage condition is estimated based on a distinction between the wanted signal that is applied to the speaker, such as a music signal, and the signal detected by means of the error microphone, i.e. the error signal. This distinction is proportional to the determined driver response, for instance. Properties of the first and the second signal include an amplitude, an energy level, or mean amplitude of frequency components, i.e. a mean of several bins of a Fast Fourier transform, of the first and second signal, respectively.

In some embodiments, the property of the first and the second signal is an amplitude of the respective signal.

For example, a reference signal level, i.e. an amplitude, is taken of the signal applied to the driver and a response signal level is taken of the signal detected by the error microphone.

In some embodiments, for calculating the driver response, the first and the second signal are bandpass filtered with a predetermined bandpass frequency range.

The first and the second signal, which may be referred to as a reference signal and a response signal as described above, may be bandpass filtered to a frequency range at which the driver response differs substantially for different acoustic leaks. For example, the predetermined frequency range is at low acoustic frequencies such as 80-200 Hz.

In some embodiments, the driver response is calculated as a ratio of energy levels of the first and the second signal.

The energy level of each signal is determined, for example via the amplitude of the first and the second signal, and the ratio of energy levels is computed to determine the driver response. For example, the ratio of energy levels results in a scalar indication of the driver response.

In some embodiments, the driver response is calculated from response values determined at predetermined frequencies or frequency ranges of the first and the second signal, respectively.

For example, the signal amplitude or energy level of the reference and the response signal is evaluated at a specific frequency or multiple frequencies.

Typically, driver responses are evaluated only in the frequency band of interest, e.g. the frequency band that differs due to leakage changes. Therefore, the detection engine in these implementations is configured to only evaluate the first and the second signal in said frequency band of interest and to ignore the driver responses outside of this band for instance. For example, the driver response is only evaluated and compared to the predetermined responses between 100 Hz and 1 kHz.

For example, the detection engine evaluates the first and the second signal at a number of distinct frequencies, for example at at least three distinct frequencies within the audio band. The amplitude or energy level of the first and the second signal, respectively, is monitored at the at least three frequencies, for instance. The result is then used to determine multiple leakage conditions for the at least three frequencies. The resulting leakage condition may be consequently determined from the multiple acoustic leakage conditions, for example as a mean value.

In an embodiment, the respective energy level of the first and the second signal is optionally computed at a number of discrete frequencies via a Goertzel filter, a peak filter or a bandpass filter. As described above, the energy levels at the different frequencies can be reduced to a scalar driver response factor and thus be used to estimate the leakage condition.

In some embodiments, the driver response is calculated by applying to the first and the second signal a process which differentiates energy into at least two frequency bands, such as a frequency transformation.

In these embodiments, the detection engine is configured to acquire the first and the second signal over a specific measurement time and consequently perform a process such as applying peak filters or a Fourier Transformation on the acquired first and second signal, respectively. For example, a Discrete or a Fast Fourier Transformation is obtained by decomposing a sequence of values of the first and the second signal into components of different frequencies. For example, the process is applied across a frequency range.

The driver response is consequently calculated by means of comparing the respective obtained signals after applying the process to the first and the second signal. For example, the driver response is proportional to or is derived from a difference or ratio of the respective obtained signals. While this method increases the total amount of processing, it in addition provides a higher degree of accuracy to the calculation of the driver response.

In some embodiments, calculating the driver response further comprises determining a first value from applying the process to the first signal, determining a second value from applying the process to the second signal, and comparing the first value to the second value.

For example, the detection engine is configured to determine a characteristic value of the respective signals obtained after applying the process to the first and the second signal, such as a mean value or a maximum value, at a predetermined frequency or frequency range. Consequently, the driver response is calculated from the first value and the second value, e.g. from a ratio of the first value and the second value.

In some embodiments, the first and the second value are calculated as mean values from data points of respective frequency transformations of the first and the second signal.

The detection engine in these embodiments is configured to calculate a first mean value of the frequency transformation of the first signal, e.g. across the entire or a specific frequency range, and a second mean value of the frequency transformation of the second signal at the same frequency range. Consequently, the detection engine calculates the driver response from a ratio of said first and second mean values, for instance.

In some embodiments, the first and the second value are determined for predetermined frequencies or frequency ranges after applying the process to the first and the second signal.

Analogous to the case in which the driver response is calculated based on energy levels of the first and the second signal, the driver response can likewise be calculated from the values of the respective frequency transformation obtained at a number of distinct frequencies. The first and the second value can for example be mean values of characteristic values of the respective frequency transformation acquired at several frequencies or frequency ranges. For example, for estimating the leakage condition the driver response at different frequency intervals, such as a lower and an upper region of the acoustic frequency band, is of interest, since varying acoustic leakage significantly impacts said frequency intervals.

In some embodiments, estimating the leakage condition comprises determining a leakage value from the determined driver response.

A convenient way of describing the leakage condition is the determination of an actual leakage value that quantifies the acoustic leakage condition currently present. For example, the leakage value is calculated as a normalized value between 0 and 1 scaling the determined driver response to a predetermined maximum and/or minimum driver response. A leakage value of 0 indicates the smallest possible acoustic leakage or no leak and a leakage value of 1 indicates the largest acceptable acoustic leakage, i.e. if the playback device has a very large leak between the front volume and the ambient environment.

In some embodiments, the leakage value is determined by comparing the determined driver response to reference values in a lookup table.

The detection engine may comprise a lookup table, for example stored in a memory of the detection engine, wherein different values of the driver response are associated to corresponding leakage values. This way, the leakage value, and therefore the leakage condition, is determined without the need of further calculations based on the driver response.

In some embodiments, the leakage condition is determined if a ratio between the sound output from the speaker and the ambient noise ratio exceeds a set threshold.

In these embodiments, the leakage condition may only be determined via the driver response if the wanted signal is loud relative to, e.g. louder than, the ambient noise at the location of the error microphone. In other cases, the leakage condition can be determined via another means, e.g. conventional means.

In cases where the leakage condition is determined by another means, a translation method between the leakage derived from the driver response and the leakage determined by said other means may be necessary. This translation method may be a lookup table.

In some embodiments, the audio system further comprises a further microphone, and the leakage condition is used to adjust a feedforward filter and/or a feedback filter and/or a compensation filter of the audio system. In this embodiment, when the ratio of wanted signal to ambient noise is taken, the ambient noise level may be taken at the location of the further microphone.

Particularly in situations when the wanted signal, e.g. music, is loud relative to ambient noise, conventional methods to adjust noise cancellation processes, i.e. feedforward and/or feedback filter, may lead to an unstable noise cancellation process or to an oscillation around an optimal value, which may be perceived as disruptive by the user of the audio system. Therefore, adjusting the noise cancellation processes based on a leakage condition that is directly derived from the driver response provides a fast and accurate means in the aforementioned situations. Furthermore, a compensation filter may be adjusted in dependence of the leakage condition for compensating for a wanted signal, e.g. music, being attenuated by the feedback noise cancellation, for instance.

In some embodiments, the leakage condition is estimated when a ratio of a wanted signal to a disturbance signal, in particular an ambient noise signal, is larger than a threshold. Otherwise, the leakage condition is estimated via a different means. In embodiments, in which estimating the leakage condition comprises calculating a leakage value, leakage values calculated via different means can be translated to the same scale, e.g. normalized to a value between 0 and 1 via a predetermined lookup table.

The above-mentioned object is further solved by a signal processing method for an ear mountable playback device that comprises a speaker and an error microphone that senses sound being output from the speaker as well as ambient sound. The method comprises generating, by means of the error microphone, an error signal, and determining from the error signal and from a signal applied to the speaker a driver response. The method further comprises estimating a leakage condition from the determined driver response.

The error signal corresponds to or is derived from the signal detected by the error microphone, i.e. a wanted signal from the speaker such as music and ambient sound.

Further embodiments of the signal processing method become apparent to a person skilled in the art from the embodiments of the audio system described above.

BRIEF DESCRIPTION OF THE DRAWINGS

The improved concept will be described in more detail in the following with the aid of drawings. Elements having the same or similar function bear the same reference symbols throughout the drawings. Hence their description is not necessarily repeated in the description to the following drawings.

In the drawings.

DETAILED DESCRIPTION

Figure 1:
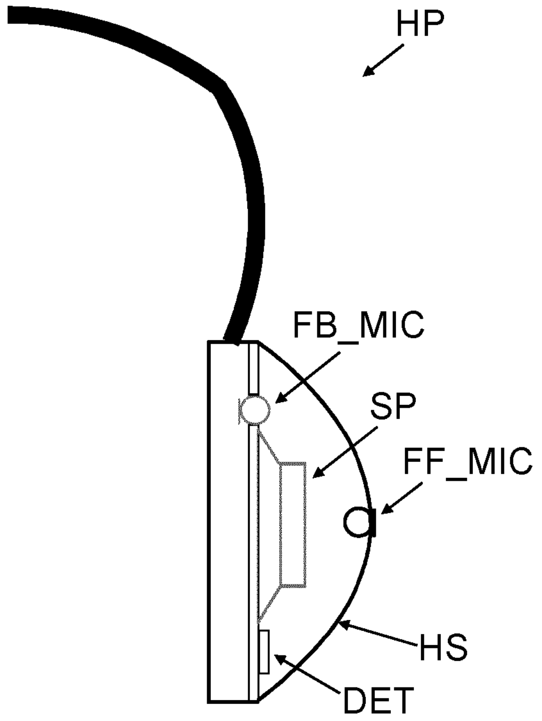
FIG. 1 shows a schematic view of a headphone.

FIG. 1 shows a schematic view of an ANC enabled playback device in form of a headphone HP that in this example is designed as an over-ear or circumaural headphone. Only a portion of the headphone HP is shown, corresponding to a single audio channel. However, extension to a stereo headphone will be apparent to the skilled reader. The headphone HP comprises a housing HS carrying a speaker SP, a feedback noise microphone or error microphone FB_MIC and optionally an ambient noise microphone or feedforward microphone FF_MIC. The error microphone FB_MIC is particularly directed or arranged such that it records both ambient noise and sound played over the speaker SP. Optionally, the error microphone FB_MIC is arranged in close proximity to the speaker, for example close to an edge of the speaker SP or to the speaker's membrane. Alternatively, the error microphone FB_MIC may be arranged close to the ear canal of the user of the headphone HP. The optional ambient noise/feedforward microphone FF_MIC is particularly directed or arranged such that it mainly records ambient noise from outside the headphone HP.

Depending on the type of ANC to be performed, the optional ambient noise microphone FF_MIC may be omitted, if only feedback ANC is performed. The error microphone FB_MIC may be used according to the improved concept to provide an error signal being the basis for a determination of the wearing condition, respectively leakage condition, of the headphone HP, when the headphone HP is worn by a user.

In the embodiment of FIG. 1, a detection engine DET is located within the headphone HP for performing various kinds of signal processing operations, examples of which will be described within the disclosure below. The detection engine DET may also be placed outside the headphone HP, e.g. in an external device located in a mobile handset or phone or within a cable of the headphone HP.

Figure 2:
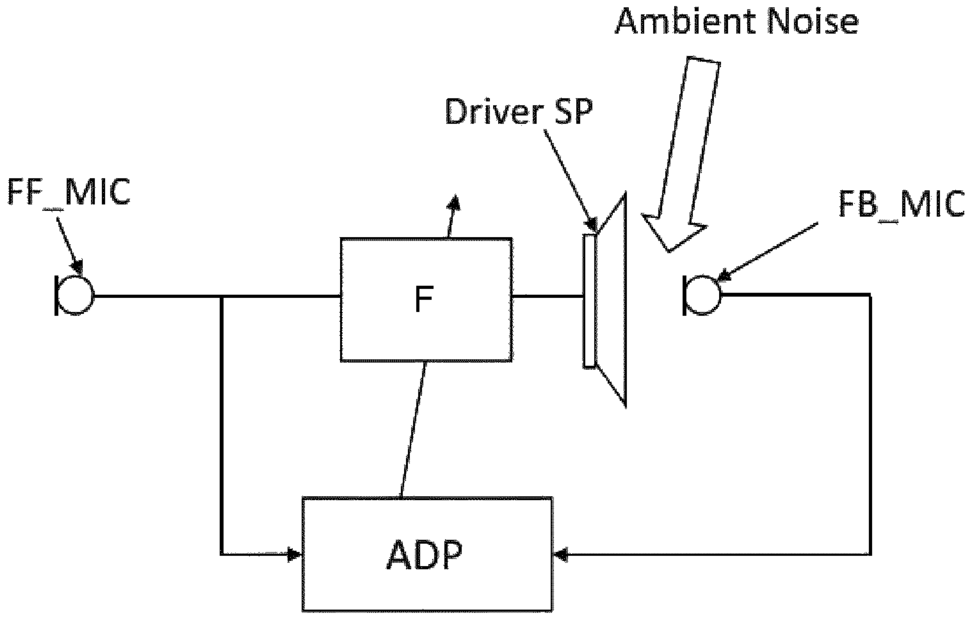
FIG. 2 shows a block diagram of a generic adaptive ANC system.

FIG. 2 shows a block diagram of a generic adaptive ANC system. The system comprises the error microphone FB_MIC and the feedforward microphone FF_MIC, both providing their output signals to an adaptation engine ADP. The noise signal recorded with the feedforward microphone FF_MIC is further provided to a feedforward filter F for generating an anti-noise signal being output via the speaker SP. At the error microphone FB_MIC, the sound being output from the speaker SP combines with ambient noise and is recorded as an error signal that includes the remaining portion of the ambient noise after ANC. This error signal is used by the sound adaptation engine ADP for adjusting a filter response of the feedforward filter.

Figure 3:
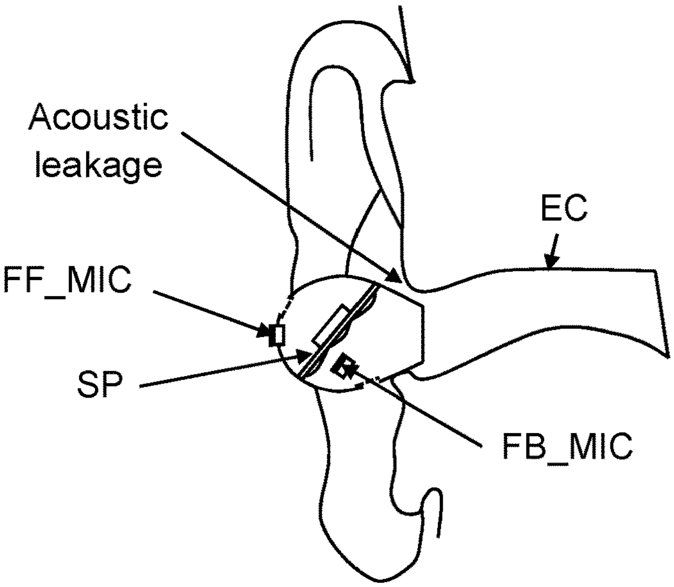
FIG. 3 shows an example representation of a "leaky" type earphone.

FIG. 3 shows an example representation of a "leaky" type earphone, i.e. an earphone featuring some leakage between the ambient environment and the ear canal EC. In particular, a sound path between the ambient environment and the ear canal EC exists, denoted as "acoustic leakage" in the drawing.

Figure 4:
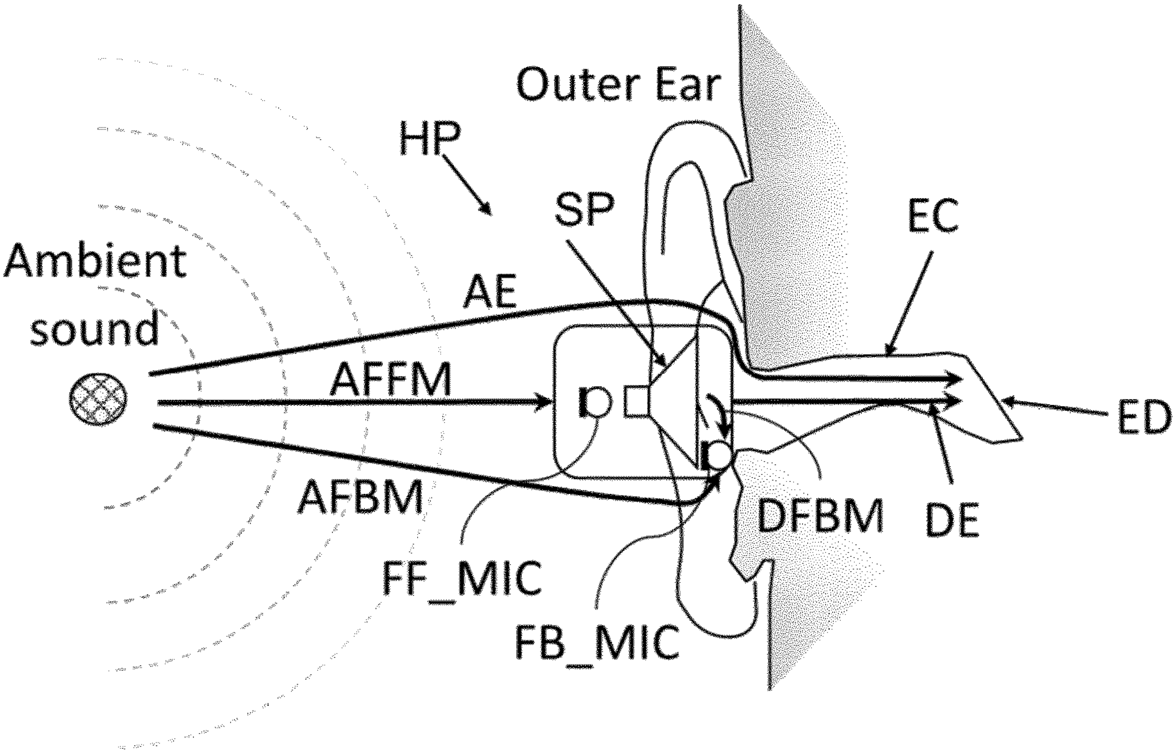
FIG. 4 shows an example headphone worn by a user with several sound paths from an ambient sound source.

FIG. 4 shows an example configuration of a headphone HP worn by a user with several sound paths. The headphone HP shown in FIG. 4 stands as an example for any ear mountable playback device of a noise cancellation enabled audio system and can e.g. include in-ear headphones or earphones, on-ear headphones or over-ear headphones. Instead of a headphone, the ear mountable playback device could also be a mobile phone or a similar device.

The headphone HP in this example features a loudspeaker SP, a feedback noise microphone FB_MIC and, optionally, an ambient noise microphone FF_MIC, which e.g. is designed as a feedforward noise cancellation microphone. Internal processing details of the headphone HP are not shown here for reasons of a better overview.

In the configuration shown in FIG. 4, several sound paths exist, of which each can be represented by a respective acoustic response function or acoustic transfer function. For example, a first acoustic transfer function DFBM represents a sound path between the speaker SP and the feedback noise microphone FB_MIC, and may be called a driver-to-feedback response function. The first acoustic transfer function DFBM may include the response of the speaker SP itself. A second acoustic transfer function DE represents the acoustic sound path between the headphone's speaker SP, potentially including the response of the speaker SP itself, and a user's eardrum ED being exposed to the speaker SP, and may be called a driver-to-ear response function. A third acoustic transfer function AE represents the acoustic sound path between the ambient sound source and the eardrum ED through the user's ear canal EC, and may be called an ambient-to-ear response function. A fourth acoustic transfer function AFBM represents the acoustic sound path between the ambient sound source and the feedback noise microphone FB_MIC, and may be called an ambient-to-feedback response function. The driver response that is subject to this disclosure results from the first acoustic transfer function DFBM, i.e. the ratio of the total sound signal detected by the error microphone FB_MIC to the total signal driving the speaker SP.

If the ambient noise microphone FF_MIC is present, a fifth acoustic transfer function AFFM represents the acoustic sound path between the ambient sound source and the ambient noise microphone FF_MIC, and may be called an ambient-to-feedforward microphone response function.

Response functions or transfer functions of the headphone HP, in particular between the microphones FB_MIC and FF_MIC and the speaker SP, can be used with a feedback filter function B and feedforward filter function F, which may be parameterized as noise cancellation filters during operation.

The headphone HP as an example of the ear-mountable playback device may be embodied with both the microphones FB_MIC and FF_MIC being active or enabled such that hybrid ANC can be performed, or as a FB ANC device, where only the feedback noise microphone FB_MIC is active and an ambient noise microphone FF_MIC is not present or at least not active. Hence, in the following, if signals or acoustic transfer functions are used that refer to the ambient noise microphone FF_MIC, this microphone is to be assumed as present, while it is otherwise assumed to be optional.

Any processing of the microphone signals or any signal transmission are left out in FIG. 4 for reasons of a better overview. However, processing of the microphone signals in order to perform ANC may be implemented in a processor located within the headphone or other ear-mountable playback device or externally from the headphone in a dedicated processing unit. The processor or processing unit may be called an adaptation engine. If the processing unit is integrated into the playback device, the playback device itself may form a noise cancellation enabled audio system. If processing is performed externally, the external device or processor together with the playback device may form the noise cancellation enabled audio system. For example, processing may be performed in a mobile device like a mobile phone or a mobile audio player, to which the headphone is connected with or without wires.

In the various embodiments, the FB or error microphone FB_MIC may be located in a dedicated cavity, as for example detailed in ams application EP17208972.4.

Figure 5:
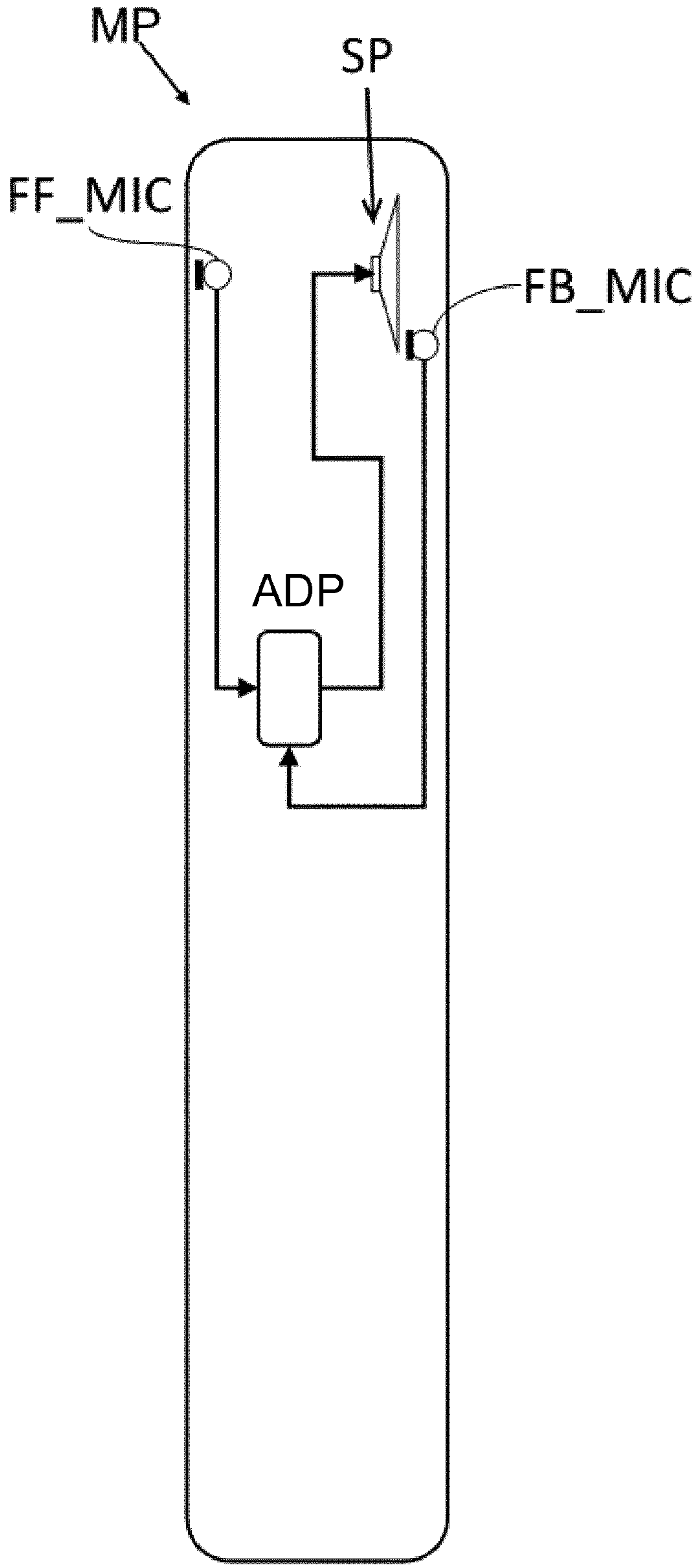
FIG. 5 shows an example representation of an ANC enabled handset.

Referring now to FIG. 5, another example of a noise cancellation enabled audio system is presented. In this example implementation, the system is formed by a mobile device like a mobile phone MP that includes the playback device with speaker SP, feedback or error microphone FB_MIC, ambient noise or feedforward microphone FF_MIC and an adaptation engine ADP for performing inter alia ANC and/or other signal processing during operation.

In a further implementation, not shown, a headphone HP, e.g. like that shown in FIG. 1 or FIG. 4, can be connected to the mobile phone MP wherein signals from the microphones FB_MIC, FF_MIC are transmitted from the headphone to the mobile phone MP, in particular the mobile phone's processor PROC for generating the audio signal to be played over the headphone's speaker. For example, depending on whether the headphone is connected to the mobile phone or not, ANC is performed with the internal components, i.e. speaker and microphones, of the mobile phone or with the speaker and microphones of the headphone, thereby using different sets of filter parameters in each case.

In the following, several implementations of the improved concept will be described in conjunction with a specific use case. It should however be apparent to the skilled person that details described for the implementation may still be applied to other implementations.

Figure 6:
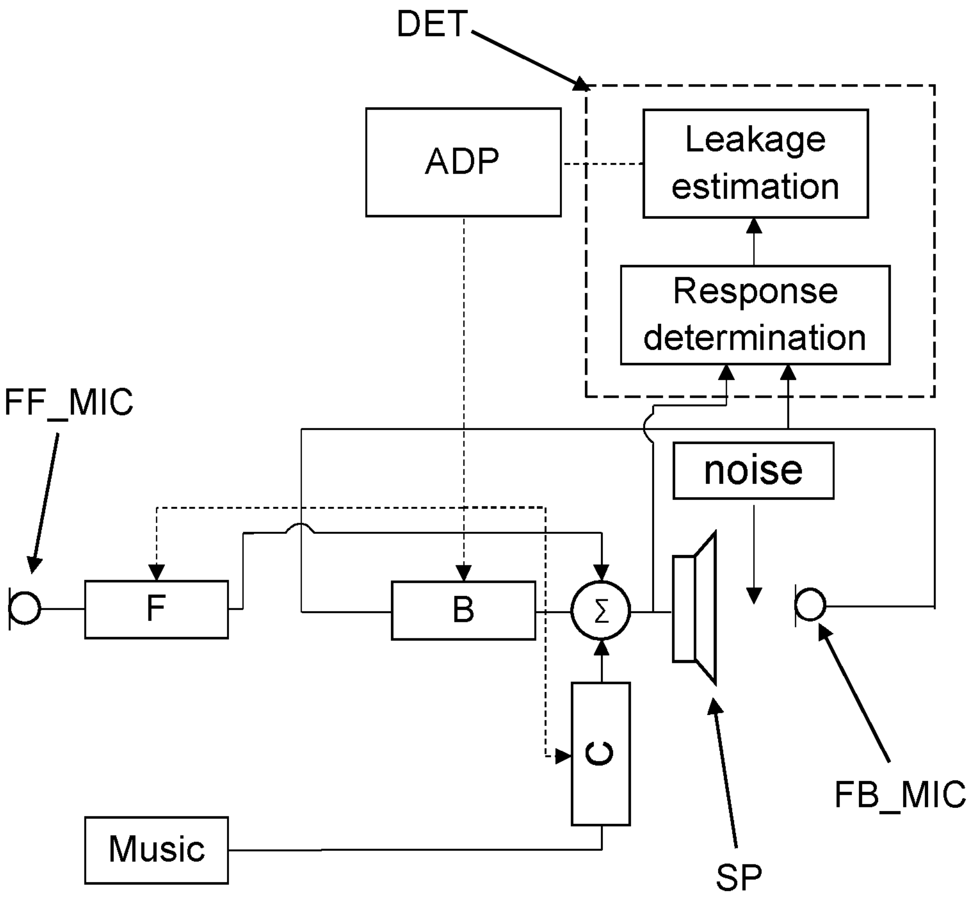
FIG. 6 shows a block diagram of an exemplary embodiment of an audio system for an ear mountable playback device according to the improved concept.

FIG. 6 shows a block diagram of a hybrid ANC audio system according to the improved concept. The system comprises the error microphone FB_MIC and the feedforward microphone FF_MIC. The noise signal recorded with the feedforward microphone FF_MIC is provided to a feedforward type first noise filter F for generating an anti-noise signal being output via the speaker SP together with a wanted signal, e.g. music. At the error microphone FB_MIC, the sound being output from the speaker SP combines with ambient noise and is recorded as an error signal that includes the remaining portion of the ambient noise after ANC. This error signal is output to a feedback type second noise filter B for generating a further anti-noise signal being summed to the anti-noise signal and the wanted signal and also output via the speaker SP.

The total signal applied to the speaker SP and the error signal from the error microphone FB_MIC are further provided to the detection engine DET for determining the driver response and a subsequent estimation of the leakage condition. For example, the driver response is calculated from the two signals and subsequently evaluated and compared to known driver responses at different leakage conditions, e.g. stored in a lookup table, in order to determine a leakage value quantifying the actual leakage condition of the earphone. Consequently, the leakage value is used by the adaptation engine ADP to adjust a filter response of the feedforward filter F and/or the of the feedback filter B.

The hybrid system in this implementation further comprises an optional music compensation filter C as detailed in ams patent U.S. Pat. No. 9,779,718 B2. The wanted signal, e.g. music, in this case is provided to the music compensation filter C in order to compensate for the wanted signal being attenuated by the feedback noise cancellation, for instance.

Figure 7:
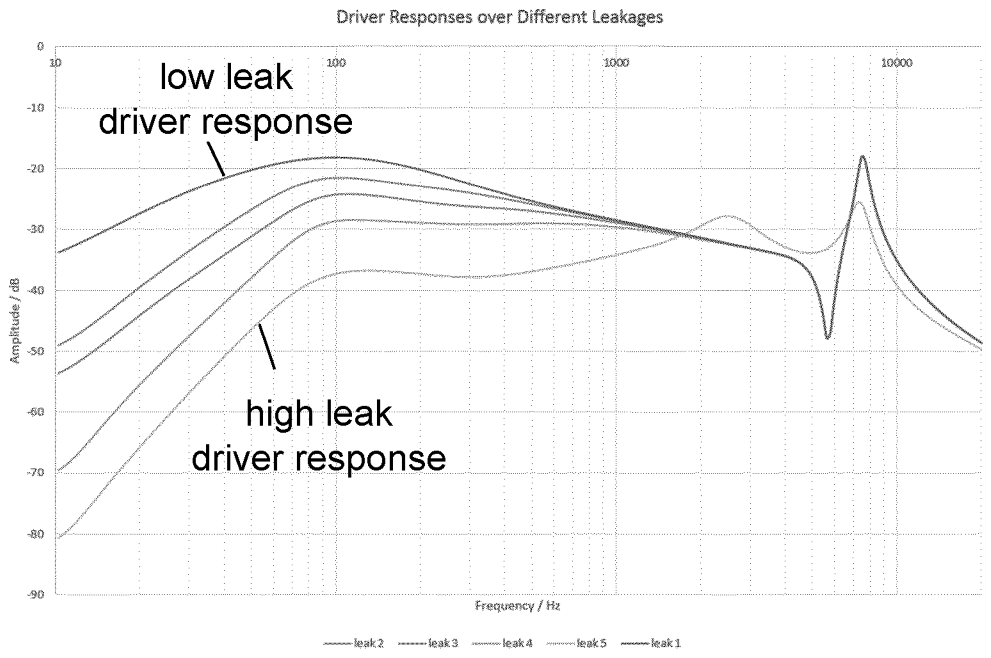
FIG. 7 shows a signal diagram displaying the frequency dependent driver responses for different acoustic leakage conditions.

FIG. 7 shows a signal diagram displaying the amplitude of the frequency dependent driver responses for different acoustic leakage conditions. For example, the marked low leak driver response corresponds to no leak, i.e. an on-ear state with no or insignificant acoustic leakage between the ear canal and the ambient environment, and the marked high leak driver response corresponds to a maximum, i.e. a state with a large acoustic leakage between the ear canal and the ambient environment. An intermediate leakage condition then results in a driver response amplitude in between aforementioned high and low leak conditions, indicated as three exemplary driver responses in the FIG. 7. For example, the typical range of possible amplitudes for the driver response between minimum and maximum is in the order of 30 dB, which again may be highly frequency dependent. For example, the driver response shows a significant, i.e. the largest, leakage dependence at low frequencies. Hence, the detection engine may be configured to only evaluate the signal applied to the speaker SP and the error signal from the error microphone FB_MIC in this frequency range, e.g. between 10 Hz and 200 Hz. This can be realized via bandpass filtering or via fast Fourier transformation of said signals, for example.

The detection engine DET may be configured to evaluate the determined driver response and to compare it to the predetermined minimum and maximum driver responses at a frequency range or at several distinct frequencies. From this, a leakage value quantifying the leakage condition may be determined, for example as a normalized value between 0 and 1, with 0 indicating the minimum and 1 corresponding to the maximum leakage condition.

The invention claimed is:

1. An audio system for an ear mountable playback device comprising a speaker;

an error microphone configured to sense sound being output from the speaker and ambient sound; and a detection engine configured to determine a driver response between the speaker and the error microphone; and estimate a leakage condition from the determined driver response when the leakage condition is estimated when a ratio of a wanted signal to a disturbance signal exceeds a threshold.

2. The audio system according to claim 1, wherein determining the driver response comprises measuring a property of a first signal that is applied to the speaker;

measuring a property of a second signal that is detected by the error microphone; and calculating the driver response from the first and the second property.

3. The audio system according to claim 2, wherein the property of the first signal is an amplitude of the first signal and the property of the second signal is an amplitude of the second signal.

4. The audio system according to claim 2, wherein for calculating the driver response, the first and the second signal are bandpass filtered with a predetermined bandpass frequency range.

5. The audio system according to claim 2, wherein the driver response is calculated as a ratio of energy levels of the first and the second signal.

6. The audio system according to claim 2, wherein the driver response is calculated from response values determined at predetermined frequencies or frequency ranges of the first and the second signal, respectively.

7. The audio system according to claim 2, wherein the driver response is calculated by applying to the first and the second signal a process which differentiates energy into at least two frequency bands.

8. The audio system according to claim 7, wherein calculating the driver response further comprises determining a first value from applying the process to the first signal;

determining a second value from applying the process to the second signal; and comparing the first value to the second value.

9. The audio system according to claim 8, wherein the first and the second value are determined for predetermined frequencies or frequency ranges after applying the process to the first and the second signal.

10. The audio system according to claim 7, wherein the process is a frequency transformation.

11. The audio system according to claim 1, wherein estimating the leakage condition comprises determining a leakage value from the determined driver response.

12. The audio system according to claim 11, wherein the leakage value is determined by comparing the determined driver response with reference values in a lookup table.

13. The audio system according to claim 1, wherein the audio system further comprises a further microphone and the leakage condition is used to adjust a feedforward filter and/or a feedback filter and/or a compensation filter of the audio system.

14. The audio system according to claim 1, wherein the driver response is determined without adapting and monitoring a filter that matches the driver response.

15. The audio system according to claim 1, wherein the leakage condition is estimated when a ratio of a wanted signal to an ambient noise signal is larger than a threshold.

16. The audio system according to claim 1, wherein the detection engine is configured to determine the driver response from a first signal that is applied to the speaker and a second signal that is detected from the error microphone; and estimate the leakage condition by comparing the determined driver response to known driver responses at different leakage conditions.

17. An ear mountable playback device comprising an audio system according to claim 1.

18. A signal processing method for an ear mountable playback device comprising a speaker and an error microphone that senses sound being output from the speaker and ambient sound, the method comprising generating by means of the error microphone an error signal;

determining from the error signal and from a signal applied to the speaker a driver response; and estimating a leakage condition from the determined driver response when the leakage condition is estimated when a ratio of a wanted signal to a disturbance signal exceeds a threshold.

* * * * *